United States Patent Office 3,494,896
Patented Feb. 10, 1970

3,494,896
POLYURETHANE COMPOSITIONS
Takeo Aoki, Shigeru Takeo, and Yuuji Takahashi, Tokyo, Japan, assignors to Hodogaya Chemical Co., Ltd., Tokyo, Japan, a corporation of Japan
No Drawing. Filed Dec. 14, 1967, Ser. No. 690,411
Claims priority, application Japan, Dec. 26, 1966, 41/84,509
Int. Cl. C08g 22/16
U.S. Cl. 260—77.5         5 Claims

ABSTRACT OF THE DISCLOSURE

An atmospheric humidity-curable polyurethane composition consisting essentially of a polyurethane prepolymer having two or more terminal isocyanate groups and an alcoholate obtained from a metal of Groups II, III and IV of the Periodic Table and a dihydric or trihydric alcohol. Said composition may contain conventional inert additives. Said composition is of one-package type and can be cured with atmospheric humidity without foaming to form a polyurethane material.

---

The present invention relates to a one-package type polyurethane composition which can be cured with atmospheric humidity without foaming and which contains a polyurethane prepolymer having terminal isocyanate groups as a base material.

Polyurethane elastomers have good properties, such as high elasticity, high adhesion, excellent low temperature-resistance, excellent abrasion-resistance, excellent oil-resistance and high chemical-resistance, and hence, have heretofore been used in a one-package form in various fields utilizing said properties, particularly as a surface coating material which forms a thick film on the surface of a material to be coated or as a casting type sealant which forms a thick polyurethane layer. For example, polyurethane elastomers are used as air-tight, water-tight and oil-tight, elastic sealants or coating materials for construction, vehicles, aircraft, vessels, machine parts and pavements. However, the prior art one-package type polyurethane composition is cured with humidity while generating carbon dioxide, whereby bubbles are formed in catings or resin layers and expansion is caused to form a porous polyurethane material. When it is applied to water-containing materials, such as concrete, wood and the like, it is essentially required to sufficiently remove the water in the substrate before applying the composition thereto. When calcium oxide is added as an antifoaming agent to the composition (Belgian Patent No. 665,752), said oxide absorbs much humidity, whereby the curing of the polyurethane prepolymer with humidity is greatly retarded and requires a very long period of time to form a product having a sufficient strength. When orthoformic ester is used as an antifoaming agent (Belgian Patent No. 647,-453), the ester is hydrolyzed with atmospheric humidity into formic acid and a corresponding monohydric alcohol to terminate the cross-linking of the polyurethane prepolymer with humidity, whereby no sufficiently elastic product is obtained. A one-package type polyurethane composition having no such drawbacks has long been desired.

The present inventors have found a one-package type polyurethane composition consisting essentially of an isocyanate group-terminated polyurethane prepolymer as a base material, said prepolymer being prepared by reacting a compound having two or more active hydrogen atoms with a polyisocyanate in a proportion suitable for the physical properties required for the intended end product, and an alcoholate of a dihydric or trihydric alcohol and, if necessary, inert additives can be cured with atmospheric humidity without foaming to form an excellent, elastic material which adheres firmly to a substrate to which the composition is applied before curing.

According to the present invention, there is provided a one-package type polyurethane composition which can be cured with atmospheric humidity without foaming into a polyurethane material and which consists essentially of a polyurethane prepolymer having two or more terminal isocyanate groups and an alcoholate of a metal of Groups II, III and IV of the Periodic Table.

When the present polyurethane composition is applied, atmospheric humidity acts on the alcoholate to hydrolyze the latter into a corresponding dihydric or trihydric alcohol, which in turn reacts with the terminal isocyanate groups of the polyurethane prepolymer to form a cross-linkage, whereby a non-forming polyurethane elastomer is obtained. Therefore, the starting polyurethane prepolymer may be of a low molecular weight, that is, may be a low-viscosity prepolymer. Thus, the present polyurethane composition is very advantageous in working.

When an alcoholate obtained from a monohydric alcohol is substituted for an alcoholate obtained from a dihydric or trihydric alcohol, the product of hydrolysis with atmospheric humidity is a monohydric alcohol, and hence, the cross-linking reaction of the prepolymer with the alcohol is partly terminated, whereby a sufficiently high molecular weight polymer is not obtained. Therefore, in order to produce a sufficiently elastic material, a high-molecular weight and high-viscosity polyurethane prepolymer must be used as the starting prepolymer. This results in a great disadvantage in working.

In the present invention, a composition which can be converted into a broad range of polymers of from a tough, hard polymer to a highly elastic polymer can be obtained by selecting a suitable polyurethane prepolymer and a suitable alcoholate depending upon the purpose of use of the composition. Further, by said selection, a low-viscosity, one-package type polyurethane composition having a long shelf life can be obtained.

The polyurethane prepolymer having terminal isocyanate groups, which is one of the constituents of the present composition, can be prepared by reacting a compound having two or more active hydrogen atoms with a polyisocyanate in a proportion suitable for the use of the composition.

The polyisocyanate which may be used to produce the prepolymer may be any of the polyisocyanates which are used as one of the starting materials for heretofore-known polyurethane compounds, or a mixture of the polyisocyanates. Said polyisocyanates include, for example, tolylene-2,4-diisocyanate, a tolylene-2,4- and 2,6-diisocyanate mixture, diphenylmethane-4,4'-diisocyanate, 3,3'-dimethyldiphenylmethane - 4,4' - diisocyanate, tetramethylene diisocyanate, hexamethylene diisocyanate, and a polyisocyanate composition of a diarylmethane diisocyanate and a polyisocyanate having two or more isocyanate groups. Further, an isocyanate prepolymer may be used instead of the above-mentioned simple polyisocyanate.

The compounds having two or more active hydrogen atoms which are to be reacted with the above polyisocyanate may be any of the hydroxyl compounds used as one of the starting materials for heretofore-known polyurethane compounds, and include, for example, polyhydric alcohols, such as ethylene glycol, diethylene glycol, butylene glycol, glycerine, hexanetriol, trimethylolpropane and pentaerythritol; mixtures of these alcohols; polyethers obtained these alcohols and ethylene oxide; and hydroxyl group-containing polyesters obtained from a polyhydric alcohol or an alcohol mixture and a di- or poly-basic carboxylic acid. Said carboxylic acid may be succinic acid, malic acid, fumaric acid, maleic acid or adipic acid. Furthermore, castor oil, a reaction product of castor oil and a polyhydric alcohol, and a polyether alcohol obtained from a polyhydric alcohol and propylene oxide may advantageously be used.

The alcoholates used in the present invention are alcoholates of metals of Groups II, III and IV of the Periodic Table, for instance, calcium, barium, magnesium, aluminum, boron, silicon or titanium, and di- or trihydric alcohols, for instance, ethylene glycol, 1,3-propanediol, 1,4-butanediol, 1,5-pentanediol, 1,6-hexanediol, diethylene glycol dipropylene glycol, glycerine, trioxyisobutane, trimethylolethane or trimethylolpropane. Examples of the alcoholates are titanium ethylene glycolate, magnesium propylene glycolate, aluminum butylene glycolate and calcium isobutoxide.

The above-mentioned alcoholate may be added to the compound having two or more active hydrogen atoms, or during or after the preparation of the prepolymer. In any case, however, the addition should be effected in a stage in which the viscosity of the prepolymer is suited to blending, because it is necessary to disperse the alcoholate in the form of a finely divided particle into the prepolymer. In blending the two components, it is preferable to add a solution of an alcoholate, a suspension of a finely divided alcoholate particle or a finely divided particle of an alcoholate to a polyurethane prepolymer, preferably in the absence of humidity, and if necessary, knead the two in the absence of humidity to obtain a good dispersion.

The amount of alcoholate added may be varied depending upon the content of isocyanate groups in the prepolymer, and in general, the molar ratio of the isocyanate groups of the prepolymer to the hydroxyl groups of the alcoholate is preferably from 0.8 to 2.0.

As the inert additives which may be used in the present invention, there are solvents, pigments, fillers and the like which are used in conventional polyurethane compositions. It is preferred that the above additives are mixed with the compound having two or more active hydrogen atoms which is one of the starting materials of the polyurethane prepolymer, then the water present in the resulting mixture is completely removed, and thereafter the mixture is subjected to reaction with the polyisocyanate to form a polyurethane prepolymer. This is because the water contained in the additives decomposes the alcoholate and greatly impairs the storage-stability and the workability of the present composition.

In the preparation of the present composition, the polyurethane prepolymer may previously be mixed with other resins, which are inactive against the isocyanate groups of the prepolymer, such as ketone resins, vinyl chloride resins, vinyl acetate resins and the like; and/or plasticizers, such as tricresyl phosphate, dibutyl phthalate, dioctyl phthalate, a diester of adipic acid and chlorobiphenyl, to improve the properties of the present composition, such, for example, as tenacity, smoothness, softness and adhesiveness.

The one-package type polyurethane composition of the present invention can be cured with atmospheric humidity into a product having not only the same good properties as conventional urethane elastomers have, but also excellent oil-resistance, water-resistance, chemical-resistance and abrasion-resistance, together with excellent recovery, low temperature-resistance and weather-resistance. In addition, said product adheres well to various substrates, such as concrete, glass, aluminum, iron and plastics, upon curing the composition thereon, because the one-package type composition before curing contains a compound having active isocyanate groups as one constituent. Referring to caulking materials, the present composition does not require the application of any adhering primer to a substrate prior to applying the composition thereto, as the other thiokol type caulking materials require, to enhance the bonding strength of the composition. The product obtained from the present composition passes through the recovery test, the cracking-resistance test and the weather-resistance test prescribed in the American Standards Association (A.S.A.) A116–1–1960, and, in addition, has good properties as elastomers as shown in the examples which follow.

The invention is further illustrated by the following examples but is not to be construed as being limited thereto.

EXAMPLE 1

1010 parts by weight of polypropylene glycol (the hydroxyl number: 55.5), 200 parts by weight of carbon black, 390 parts by weight of talc powder and 80 parts by weight of dioctyl phthalate were mixed together and dehydrated under reduced pressure. To the resulting mixture was added 174 parts by weight of tolylene-2,4- and 2,6-diisocyanate (80:20), and then the resulting mixture was subjected to reaction at 70° C. for 5 hours, after which the mixture was further mixed with 748 parts by weight of a polyester triol (the hydroxyl number: 74.8; the acid value: 1.03) prepared from completely dehydrated adipic acid, etheylene glycol and trimethylolpropane and 51.5 parts by weight of magnesium propylene glycolate and then subjected to reaction at 80° C. for 6 hours to obtain a black, viscous material. This material was poured into and filled in a groove-shaped mold having a depth of 12.7 mm. and a width of 12.7 mm. and cured in the air to obtain an elastomer completely free from bubbles, which passed through the test according to the A.S.A. mentioned above. The properties of the elastomer obtained are as shown below.

150% modulus _____kg./cm.$^2$__ 10.8
Elongation _____percent__ 780

EXAMPLE 2

1000 parts by weight of polyoxyglycolether triol (the hydroxyl number: 56.0) consisting of propylene oxide and glycerine was mixed with 40 parts by weight of rutile type titanium oxide, 420 parts by weight of talc powder and 280 parts by weight of asbestos powder, and the resulting mixture was dehydrated under reduced pressure, to which was added a product obtained by reacting 2060 parts by weight of polypropylene glycol (the hydroxyl number: 54.5) with 500 parts by weight of 4,4′-diphenylmethane diisocyanate at 70° C. for 4 hours, and the resulting mixture was further subjected to reaction at 80° C. for 5 hours. The reaction product was then thoroughly mixed with 50 parts by weight of titanium ethylene glycolate to obtain a white, viscous mtaerial. An aluminum groove-shaped mold standing so that the opening thereof is vertical was filled with the thus produced material to obtain a cured product without any sag in 24 hours. Said curved product had good elasticity and adhesiveness.

EXAMPLE 3

1530 parts by weight of a polyester (the hydroxyl number: 73.2; the acid value: 1.62) prepared from adipic acid and 1,4-butanediol was reacted with 116 parts by weight of tolylene-2,4- and 2,6-diisocyanate (80:20) at 60° C. for 3 hours, and the product was mixed with a plastisol prepared by kneading 380 parts by weight of aluminum powder, 330 parts by weight of calcium carbonate and 40 parts by weight of vinyl chloride resin (the average degree of polymerization: 1,100) with 60 parts by weight of dibutyl phthalate, and the resulting mixture was dehydrated under reduced pressure, and then mixed with 116 parts by weight of fresh tolylene-2,4- and 2,6-diisocyanate (80:20) and 36 parts by weight of aluminum diethylene glycolate and subjected to reaction at 70° C. for 5 hours to obtain about 2600 parts by weight of an aluminum-color, viscous material. The cured product of this material was an elastomer completely free from bubbles, and passed through the test of the A.S.A.

mentioned above. The properties of the cured product were as follows:

150% modulus _____ kg./cm.² __ 13.2
Elongation _____ percent __ 560

What we claim is:

1. An atmospheric humidity-curable polyurethane composition consisting essentially of a polyurethane prepolymer having at least two terminal isocyanate groups and an alcoholate obtained from a metal of Groups II, III and IV of the Periodic Table and a polyhydric alcohol selected from the group consisting of dihydric alcohols and trihydric alcohols.

2. A composition according to claim 1, which further contains inert additives selected from the group consisting of solvents, pigments, fillers, and plasticizers.

3. A composition according to claim 1, wherein the alcoholate is aluminum diethylene glycolate.

4. A composition according to claim 1, wherein the alcoholate is titanium ethylene glycolate.

5. A composition according to claim 1, wherein the alcoholate is magnesium propylene glycolate.

References Cited

UNITED STATES PATENTS

| | | | |
|---|---|---|---|
| 3,250,797 | 5/1966 | Woods et al. | 260—462 |
| 3,369,000 | 2/1968 | Blomeyer et al. | 260—75 |
| 3,450,648 | 6/1969 | Windemuth et al. | 260—2.5 |

DONALD E. CAZAJA, Primary Examiner

H. S. COCKERAM, Assistant Examiner

U.S. Cl. X.R.

260—18, 30.6, 31.8, 858, 859